(12) United States Patent
Aiello et al.

(10) Patent No.: US 7,073,945 B2
(45) Date of Patent: Jul. 11, 2006

(54) DYNAMIC RADIAL CAPILLARY SEAL

(75) Inventors: Anthony Joseph Aiello, Aptos, CA (US); Paco Gregor Flores, Felton, CA (US); Klaus Dieter Kloeppel, Watsonville, CA (US); Ali Khurram, Scotts Valley, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 133 days.

(21) Appl. No.: 10/701,943

(22) Filed: Nov. 4, 2003

(65) Prior Publication Data

US 2004/0091188 A1   May 13, 2004

Related U.S. Application Data

(60) Provisional application No. 60/424,214, filed on Nov. 5, 2002.

(51) Int. Cl.
    *F16C 33/74*   (2006.01)

(52) U.S. Cl. .................................................... 384/107
(58) Field of Classification Search ............... 384/107, 384/110, 112, 113, 114, 119, 120, 124
See application file for complete search history.

(56) References Cited

U.S. PATENT DOCUMENTS

| 5,423,612 A | 6/1995 | Zang et al. |
| 5,715,116 A | 2/1998 | Moritan et al. |
| 6,154,339 A | 11/2000 | Grantz et al. |
| 6,181,039 B1 * | 1/2001 | Kennedy et al. ............ 384/110 |
| 2003/0190100 A1 | 10/2003 | Grantz et al. |
| 2004/0032175 A1 | 2/2004 | Grantz et al. |

* cited by examiner

*Primary Examiner*—Lenard A. Footland
(74) *Attorney, Agent, or Firm*—Morrison & Foerster LLP (57) ABSTRACT

A fluid dynamic bearing motor is provided that comprises a stationary member, a rotating member that is configured to rotate about a rotational axis, a fluid dynamic bearing that is configured to support relative rotation between the stationary member and the rotating member, and a dynamic radial capillary seal defined at least in part by the rotating member.

9 Claims, 9 Drawing Sheets

DYNAMIC RADIAL CAPILLARY SEAL

CROSS REFERENCE TO RELATED APPLICATIONS

This application claims the priority of U.S. Provisional Application Ser. No. 60/424,214, filed Nov. 5, 2002 by Aiello et al. (entitled "Dynamic Radial Capillary Seal For FDB Motors"), which is herein incorporated by reference.

FIELD OF THE INVENTION

The present invention relates generally to fluid dynamic bearing motors, and relates more specifically to small form factor fluid dynamic bearing motors that utilize radial capillary seals.

BACKGROUND OF THE INVENTION

Disc drive memory systems have been used in computers for many years for storage of digital information. Information is recorded on concentric tracks of a magnetic disc medium, the actual information being stored in the forward magnetic transitions within the medium. The discs themselves are rotatably mounted on a spindle, while the information is accessed by read/write heads generally located on a pivoting arm which moves radially over the surface of the rotating disc. The read/write heads or transducers must be accurately aligned with the storage tracks on the disk to ensure proper reading and writing of information.

During operation, the discs are rotated at very high speeds within an enclosed housing using an electric motor generally located inside the hub or below the discs. Such known spindle motors typically have had a spindle mounted by two ball bearings to a motor shaft disposed in the center of the hub. The bearings are spaced apart, with one located near the top of the spindle and the other spaced a distance away. These bearings support the spindle or hub about the shaft, and allow for a stable rotational relative movement between the shaft and the spindle or hub while maintaining accurate alignment of the spindle and shaft. The bearings themselves are normally lubricated by highly refined grease or oil.

The conventional ball bearing system described above is prone to several shortcomings. First is the problem of vibration generated by the balls rolling on the bearing raceways. This is one of the conditions that generally guarantee physical contact between raceways and balls, in spite of the lubrication provided by the bearing oil or grease. Hence, bearing balls running on the generally even and smooth, but microscopically uneven and rough raceways, transmit the rough surface structure as well as their imperfections in sphericity in the vibration of the rotating disc. This vibration results in misalignment between the data tracks and the read/write transducer. This source of vibration limits the data track density and the overall performance of the disc drive system.

Further, ball bearings are not always scalable to smaller dimensions. This is a significant drawback, since the tendency in the disc drive industry has been to continually shrink the physical dimensions of the disc drive unit.

As an alternative to conventional ball bearing spindle systems, much effort has been focused on developing a fluid dynamic bearing. In these types of systems, lubricating fluid, either gas or liquid, functions as the actual bearing surface between a stationary shaft supported from the base of the housing, and the rotating spindle or hub. Liquid lubricants comprising oil, more complex fluids, or other lubricants have been utilized in such fluid dynamic bearings. The reason for the popularity of the use of such fluids is the elimination of the vibrations caused by mechanical contact in a ball bearing system, and the ability to scale the fluid dynamic bearing to smaller and smaller sizes.

Bearing designs lubricated with liquid require sealing at the ends of the fluid bearings to maintain fluid in the bearings and to avoid contamination of the disk drive or leaking caused by escaping bearing fluid. Typically, this is accomplished by capillary seals defined between portions of the stationary and rotating parts. However, many traditional capillary seals are oriented vertically, in-line with the journal bearing. Thus, the capillary seals require significant axial space to maintain adequate seal capacity, and the axial space occupied by the seals reduces the space available to the journal bearings. Because angular stiffness of the system is generally directly proportional to the length of the bearing area, it is desirable to conserve as much axial space as possible for the journal bearings.

One solution to this problem is the implementation of a radial capillary seal (see FIG. 1B) that requires less axial height to be taken from the journal bearings, and allows for a much larger seal capacity due to its larger diameter. However, one drawback to such a design is the necessity to locate it on a stationary part of the motor, so that it is not subjected to centrifugal forces.

Thus, there is a need in the art for a capillary seal that does not take significant axial height away from the journal bearings and is capable of being located on a rotating motor part. The seal design should also provide a fluid reservoir capacity associated with a journal bearing that supports the sleeve for rotation around a stationary shaft motor.

SUMMARY OF THE INVENTION

The present invention is intended to provide a fluid dynamic bearing assembly incorporating a capillary seal which is especially useful in a low profile, stationary shaft assembly.

More particularly, the present invention is to provide a capillary seal which uses minimum axial space so that the length of the bearing can be optimized.

In a further advantage, the present invention provides a capillary seal which has high shock resistance.

In yet another feature of the invention, the design provides a capillary seal which also provides an oil reservoir typically larger than that which can be achieved with a conventional capillary seal so that the fluid in the fluid dynamic bearing gap is maintained.

A fluid dynamic bearing motor is provided comprising a stationary member, a rotating member that is configured to rotate about a rotational axis, a fluid dynamic bearing that is configured to support relative rotation between the stationary member and the rotating member, and a dynamic radial capillary seal defined at least in part by the rotating member.

BRIEF DESCRIPTION OF THE DRAWINGS

So that the manner in which the above recited embodiments of the invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are

DETAILED DESCRIPTION

Figure 1A:
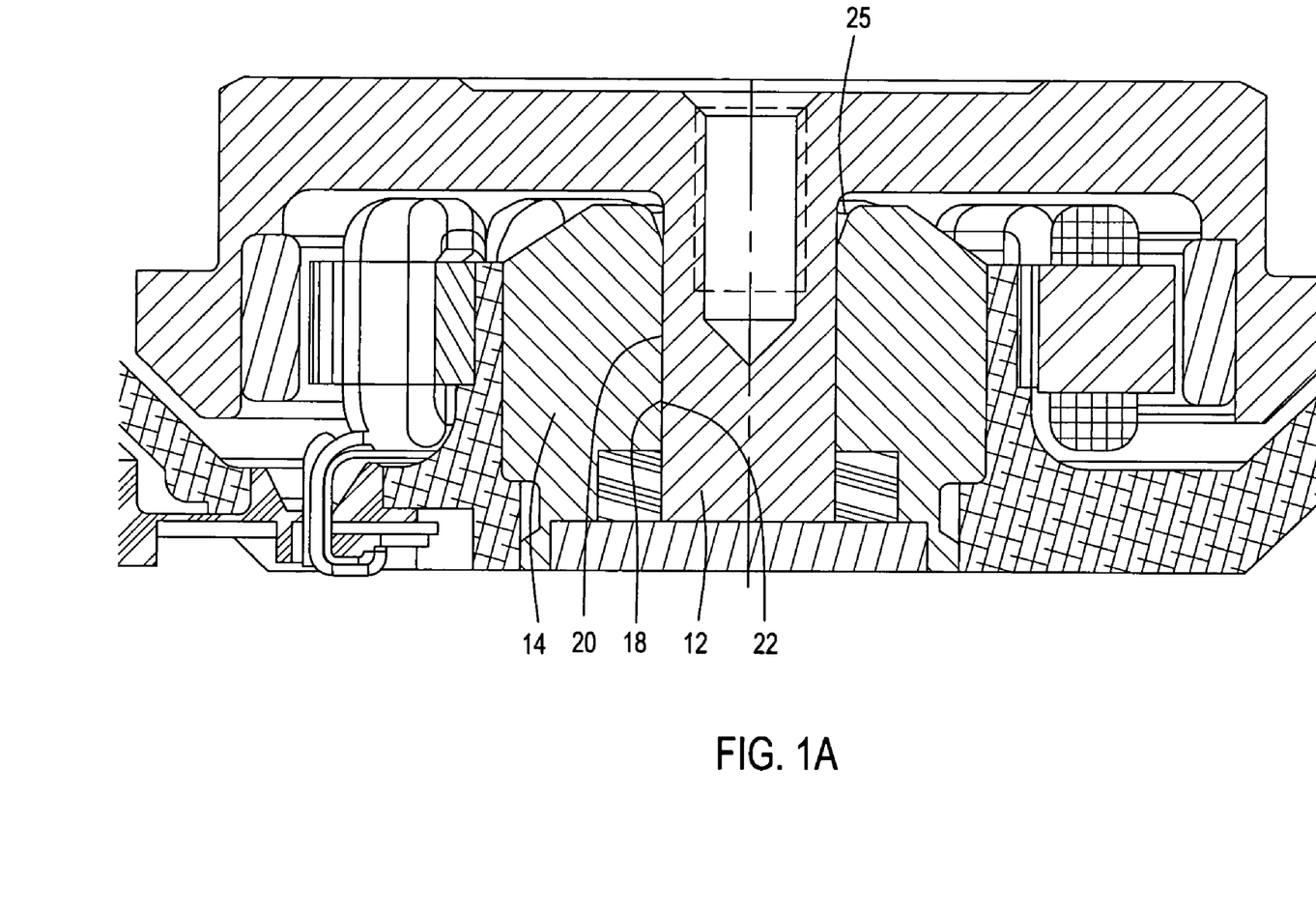
FIG. 1A depicts a capillary seal.

FIG. 1A illustrates a cross section through a typical motor incorporating a conventional capillary seal at an end of the journal bearing. In this example, the rotating shaft 12 rotates within a sleeve 14. The shaft is supported for rotation by a journal bearing defined in a gap 18 between a surface 20 of sleeve 14 and a facing surface 22 of shaft 12. Fluid in the gap 18 is pressurized by grooves on one of the two surfaces 20, 22 to support the relative rotation of the shaft and sleeve. To retain the fluid in the gap, and to replenish any fluid which may be lost to evaporation, a capillary seal 25 of known design is provided, defined by the diverging walls of 18, 22 of the shaft and sleeve. It is readily apparent that the axial length of the capillary seal noticeably diminishes the axial length available for the journal bearing.

Figure 1B:
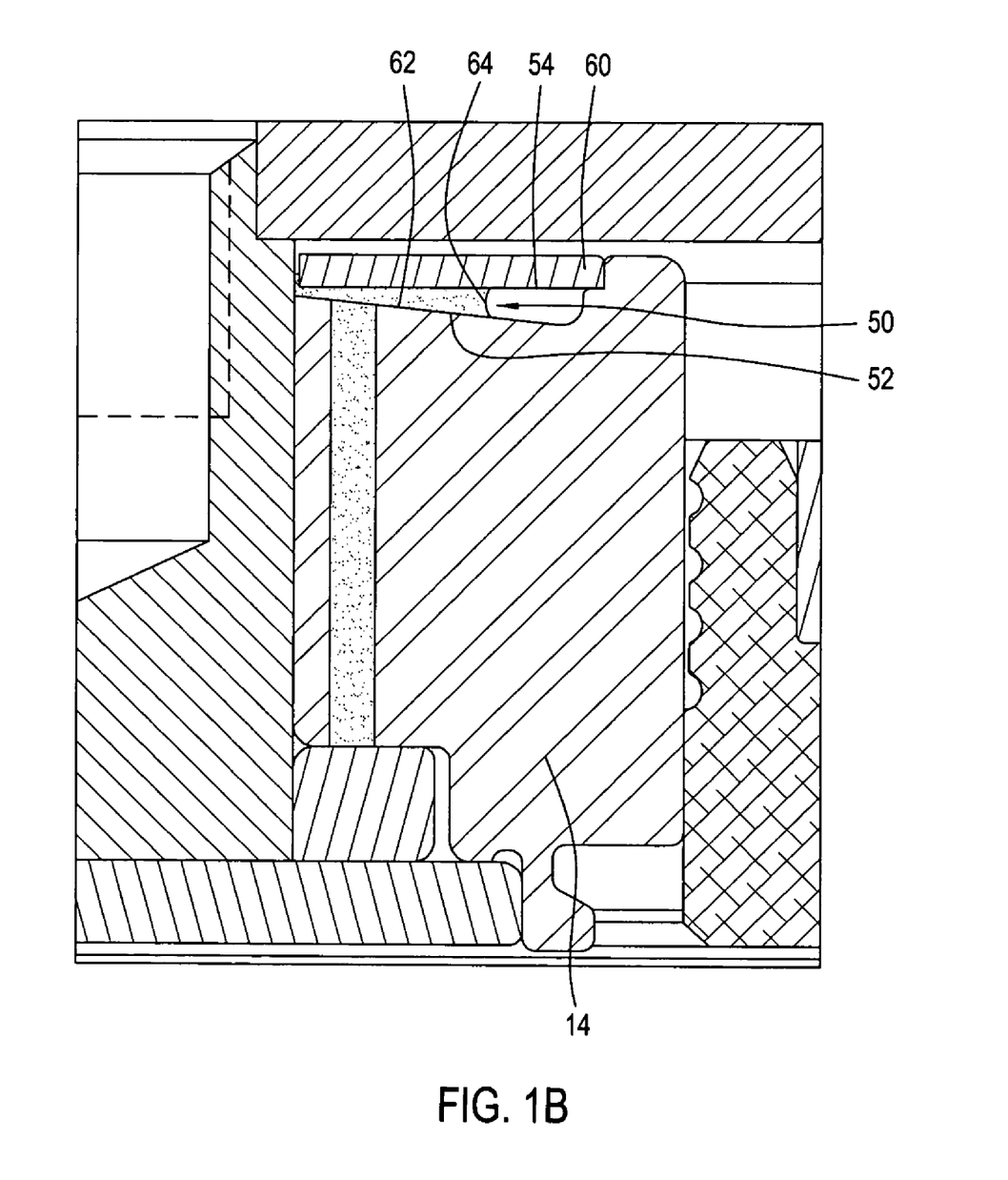
FIG. 1B depicts a radial capillary seal used with a rotating shaft.

FIG. 1B is a partial sectional view of a radial capillary seal as it would appear if incorporated in a rotating shaft motor of the design of FIG. 1A. In this design, the radial capillary seal generally indicated as 50 is defined between radially diverging surface 52 of sleeve 14 and surface 54 of shield 60, the surfaces tapering toward the shaft. The seal incorporates a reservoir 62 ending at a meniscus 64 to both prevent unnecessary fluid loss from the system and to replenish the system with fluids lost due to evaporation. While the design is effective, it is limited to use in a rotating shaft, stationary sleeve design; that is, the capillary seal as shown in design must be stationary. The present invention is intended to bring the benefits of a radial capillary seal to designs with a fixed shaft and rotating sleeve; such designs are capable of longer journal lengths and greater stability.

Figure 2:
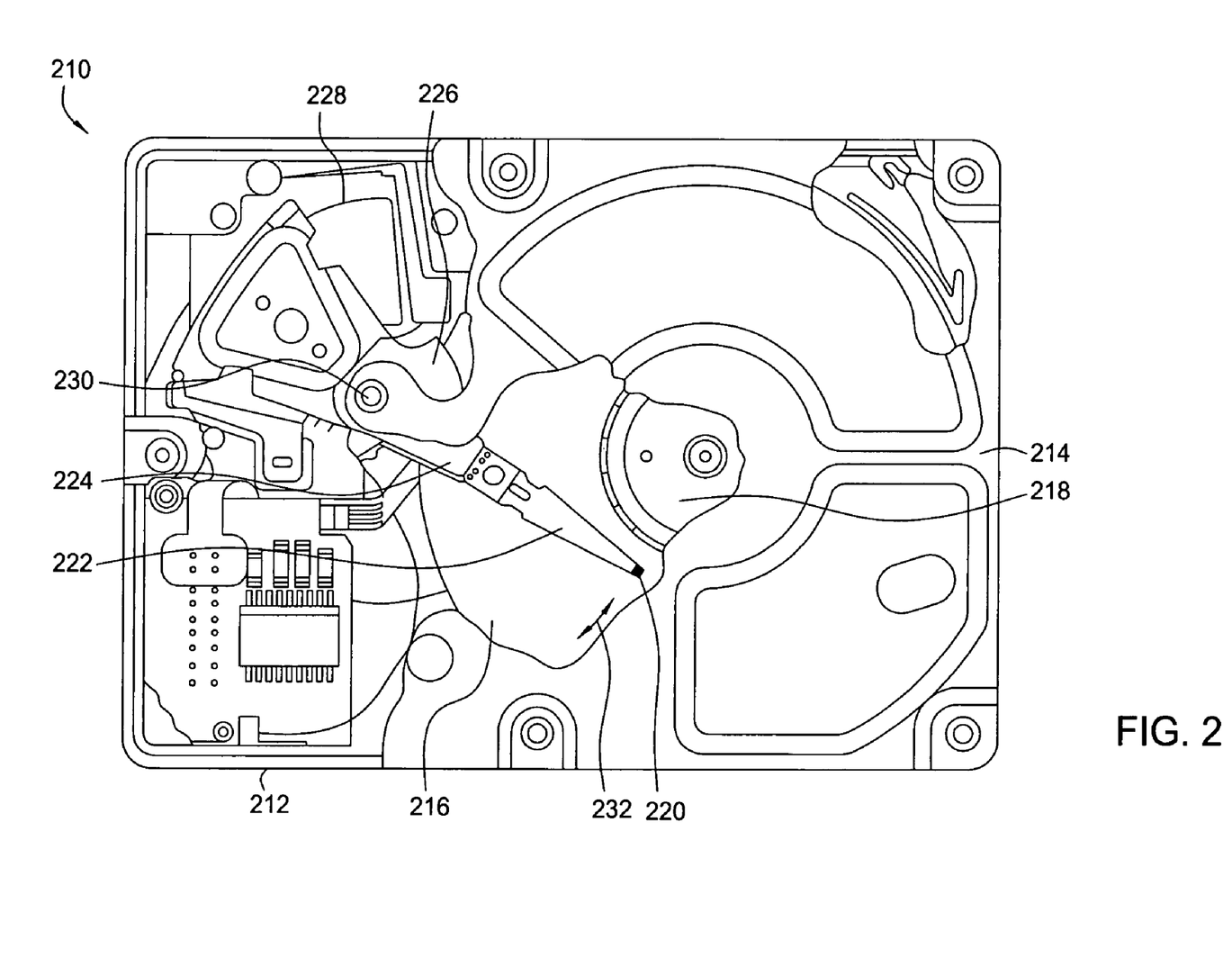
FIG. 2 depicts a plan view of one embodiment of a disk drive that comprises a motor in which the invention is used.
Figure 3A:
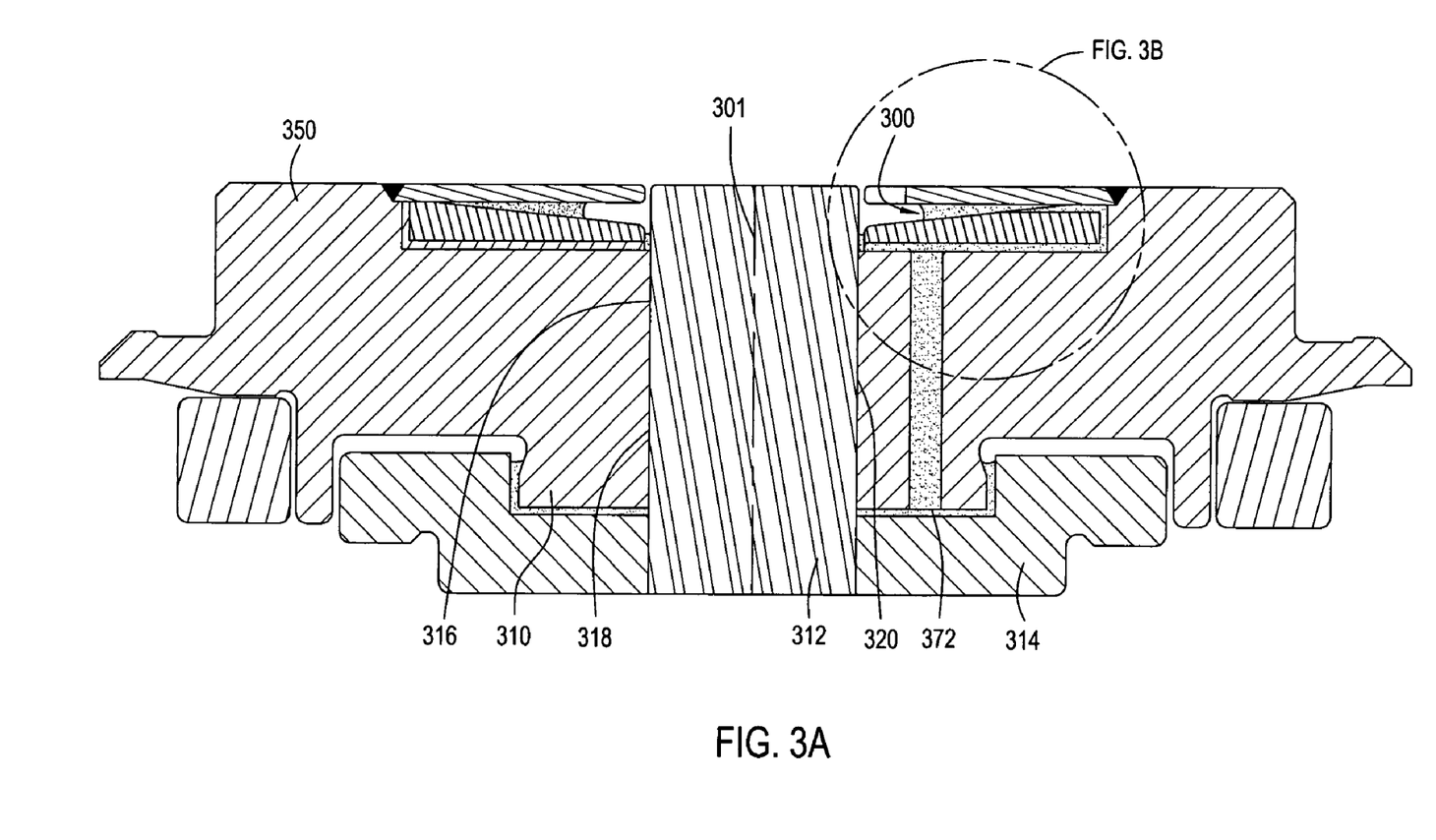
FIG. 3A depicts a side sectional view of one embodiment of a motor that incorporates a dynamic radial capillary seal of the present invention.

FIG. 2 depicts a plan view of one embodiment of a disk drive 210 in which embodiments of the invention may be used. Referring to FIG. 2, the disk drive 210 includes a housing base 212 and a top cover plate 214. The housing base 212 is combined with cover plate 214 to form a sealed environment to protect the internal components from contamination by elements outside the sealed environment. The base and cover plate arrangement shown in FIG. 2 is well known in the industry; however, other arrangements of the housing components have frequently been used, and aspects of the invention are not limited by the particular configuration of the disk drive housing. Disk drive 210 further includes a disk pack 216 that is mounted on a hub (see FIGS. 3 and 5) for rotation on a spindle motor (not shown) by a disk clamp 18. Disk pack 16 includes one or more of individual disks that are mounted for co-rotation about a central axis. Each disk surface has an associated read/write head 220 that is mounted to the disk drive 210 for communicating with the disk surface. In the example shown in FIG. 2, read/write heads 220 are supported by flexures 222 that are in turn attached to head mounting arms 224 of an actuator 226. The actuator shown in FIG. 2 is of the type known as a rotary moving coil actuator and includes a voice coil motor (VCM), shown generally at 228. Voice coil motor 228 rotates actuator 226 with its attached read/write heads 220 about a pivot shaft 230 to position read/write heads 220 over a desired data track along a path 232.

FIG. 3A is a vertical sectional view of an exemplary embodiment of a dynamic radial capillary seal 300 incorporated in a motor which comprises in part a rotating sleeve 310 surrounding a fixed shaft 312. The sleeve 310 is coupled to a hub 350 (or they can be one contiguous element). Obviously, the dynamic radial capillary seal 300 is useable in any rotating sleeve motor, and it is not to be limited to the present design.

In this exemplary motor design, the shaft 312 is shown affixed to a section of a base 314. The sleeve 310 is configured to rotate about a rotational axis 301. The sleeve 310 is supported for rotation in part by journal bearing 316, which is typically defined along the journal by the shaft and sleeve; separated by a separation region 320 along the journal. It is clear from inspection of this figure and a comparison to FIG. 1A that the length of the journal bearing and therefore the overall stability of the rotating sleeve is enhanced by eliminating the conventional capillary seal which has previously been defined at at least one end of the journal bearing and using instead the dynamic radial capillary seal 300 shown herein.

Figure 3B:
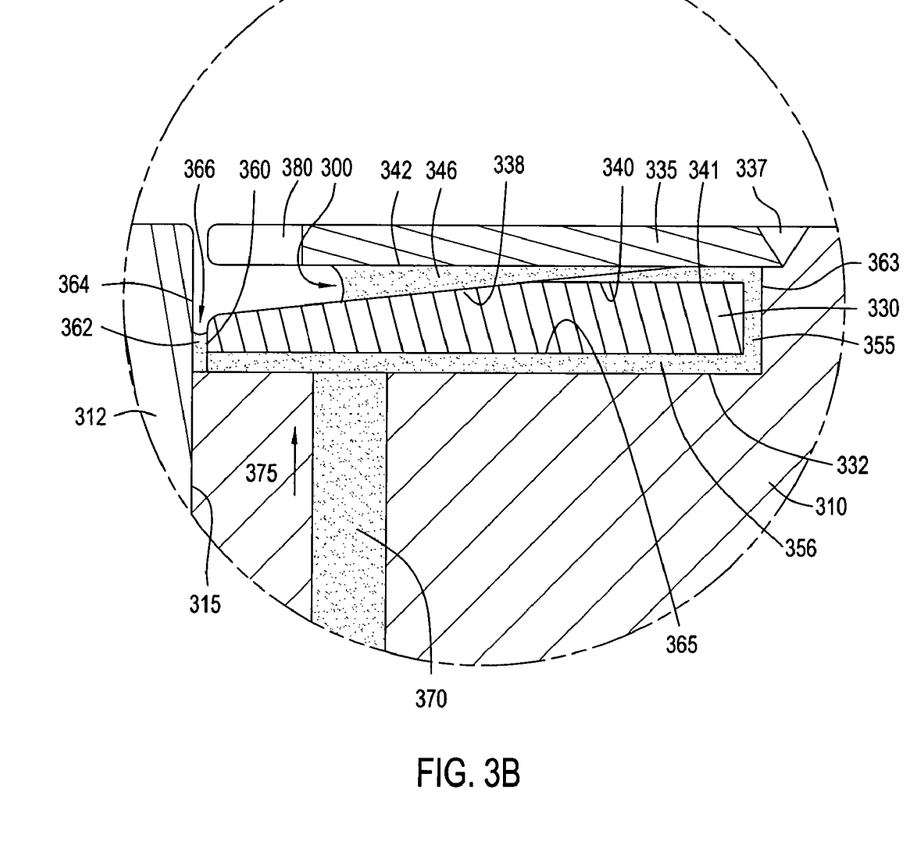
FIG. 3B illustrates an enlarged sectional view of the radial capillary seal of the present invention, as incorporated in the motor of FIG. 3A.

To establish the dynamic radial capillary seal 300, a seal ring 330 is pressed in place atop a shoulder surface 332 of sleeve 310 as is shown in greater detail in FIG. 3B which is an enlarged view of the section of FIG. 3A. This seal ring is then overlayed axially by a seal shield 335 which is illustrated as lying at least partially atop the ring 330 and being welded or bonded in place 337 as is known in this art. However, rather than lying directly atop the seal ring 330, the shield may rest on a separate shoulder defined in the sleeve 310.

At least a portion 338 of the top surface 340 is angled (typically in the range of 5–15°) axially away from the bottom surface 342 of shield 335 to form a capillary seal of diverging surfaces and a bearing fluid reservoir 346. The top surface 340 of the seal ring 330 is typically angled around the entire circumference of the ring 330 so that a substantial reservoir is formed, and lubricant is maintained in the axial gap which is diminishing in the radially outward direction between the ring 330 and the shield 335; this fluid is maintained by surface tension forces and additionally by centrifugal force due to the spinning condition. Additionally, the inner diameter surface 360 of the seal ring 330 forms or defines a small gap 362 with the outer surface 364 of the shaft 312. This small annular gap 362, when the journal bearing is filled with fluid, also fills with lubricant and will be referred to hereinafter as a secondary seal 366.

Figure 4A:
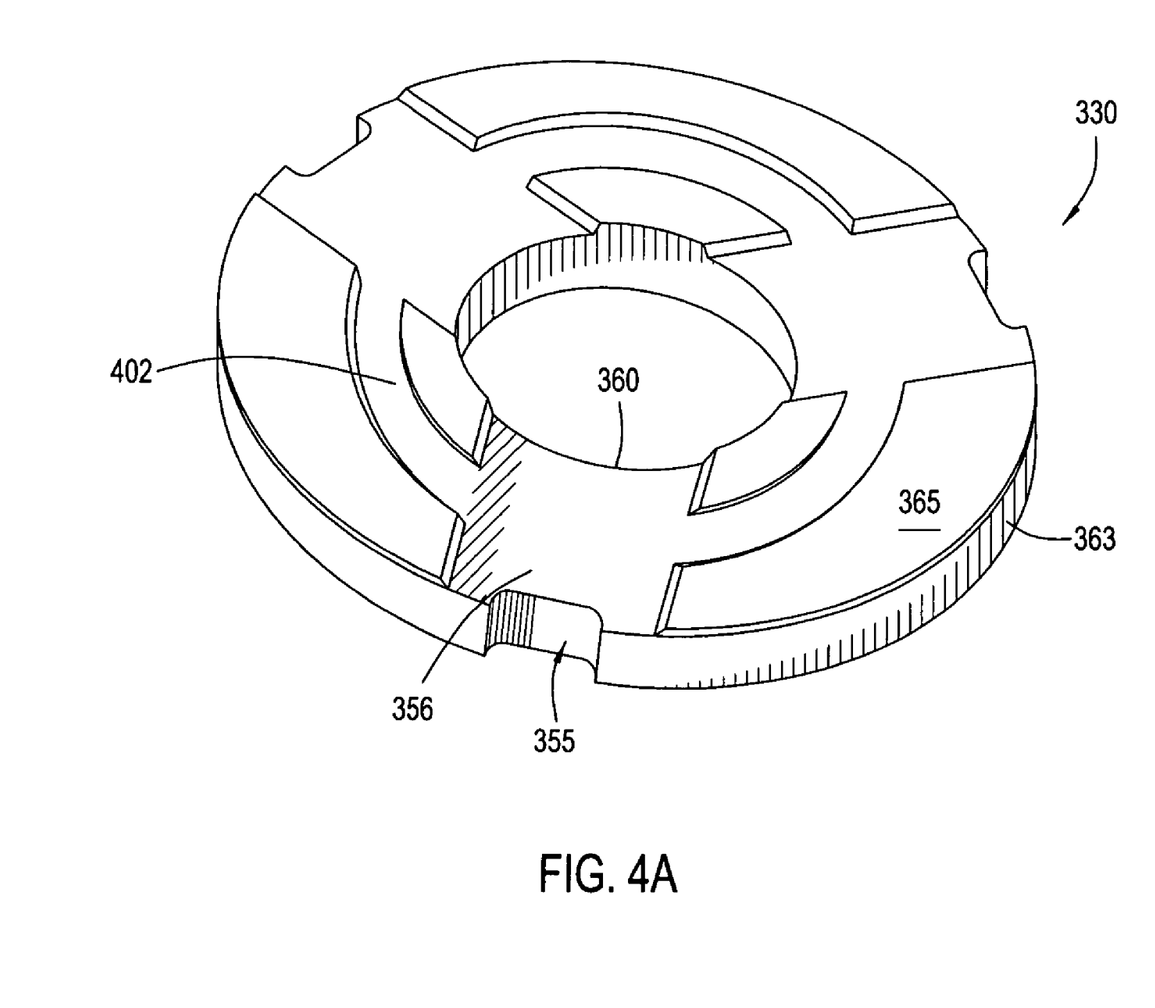
FIG. 4A illustrates an isometric view of one embodiment of one surface of a seal ring for use the present invention.

In a further feature, outer surface 363 and bottom surface 365 of the seal ring 330 are grooved, relieved or partially cut away to form channels 355 and 356, respectively, connecting the reservoir 346 to the secondary seal 366 and the journal bearing gap 315. These channels will more clearly appear in the description of the seal ring 330 which appears in FIGS. 4A & 4B below.

The embodiments of both FIGS. 3A and 3B show the seal 300 used in combination with a recirculation path comprising a recirculation channel 370 extending from a plenum region 372 defined between the sleeve 310 and the base 314 up to the lower channel 356. The fluid circulation which is typically in the direction of the arrow 375 is achieved by incorporating asymmetry into the journal bearings 316 and 318 to achieve a net pumping direction down the journal gap 315 away from the seal 300 and returning through recirculation channel 370 towards the seal 300. However, it should be noted that this seal 300 is also useful without the recirculation path being provided, with the seal 300 being located at or near either end of the journal bearing 316, 318.

Figure 3C:
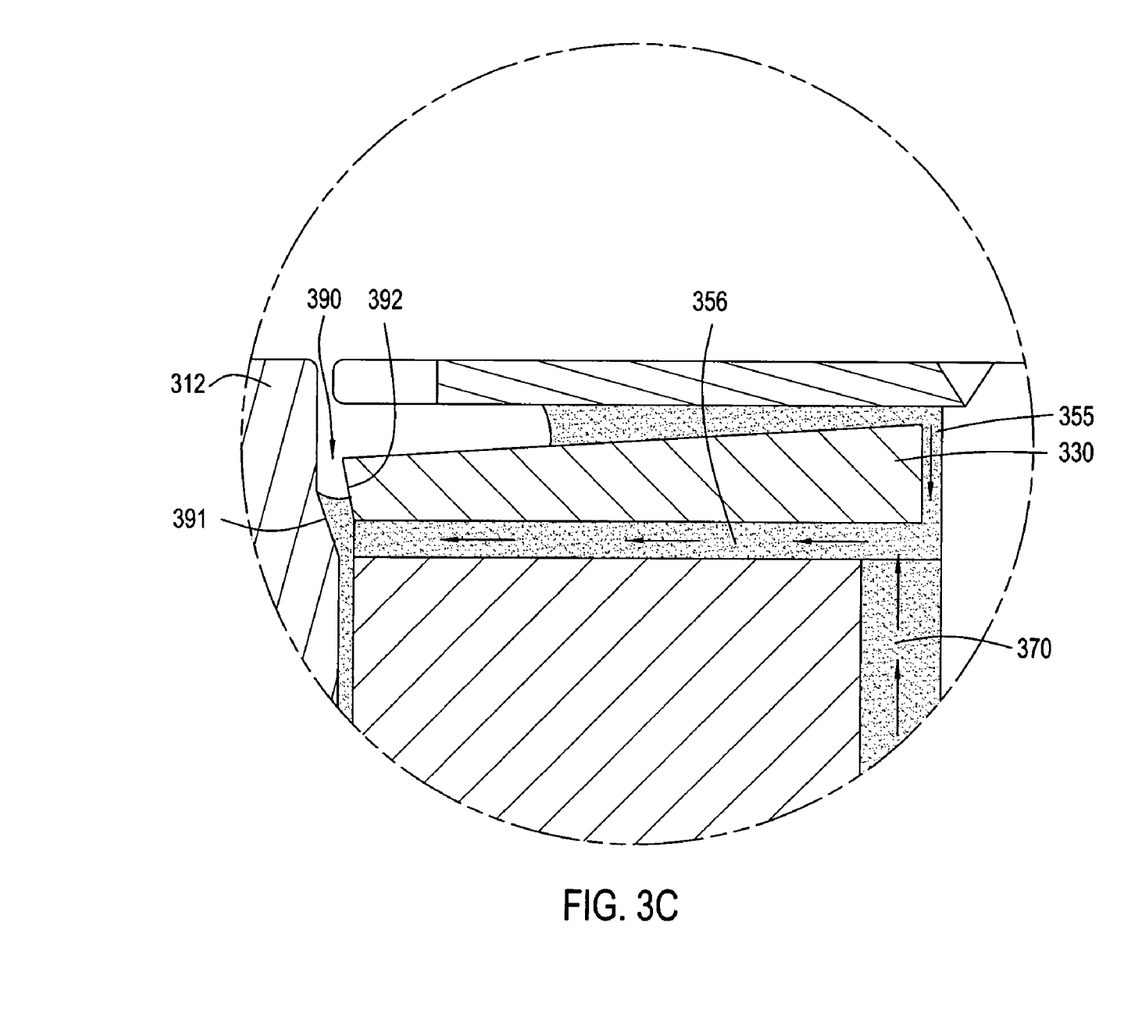
FIG. 3C is an enlarged partial sectional view of a modified embodiment of the present invention.

In normal operation, after filling which will be discussed below, the lubricant in the journal bearing 316, 318 is sealed in by the secondary seal 366 which is a capillary seal defined by the surfaces 360, 364; this secondary seal 366 is of relatively low capacity and small axial height. These surfaces 360, 364 may be radially diverging (as shown in FIG. 3C), depending on the size of the opening 362, which, while narrow, is usually greater than the journal gap. In order to ensure the integrity of this secondary seal 366 over evaporation life, lubricant is constantly available to it and may even be fed to it from the larger centrifugal capillary seal reservoir 346 via feed channels 355, 356 and 357 utilizing surface tension forces and, where the recirculation channel 370 is present, motor bearing circulation flow. Interaction with bearing circulation flow also allows this seal design to purge air from the motor bearing by providing a path for air bubbles to escape the motor. Such bubbles would be carried by the lubricant stream through the recirculation channel 370 in the direction of arrow 375; but upon reaching the lower channel 356, would be entrained in the lubricant found therein and carried off through the lower channel 356 and end channel 355 to reach the reservoir 346 and then escape through the open end of the reservoir. Alternatively, bubbles will likely escape through secondary seal 366.

In cases where the motor bearing design does not include circulation or the recirculation path, the air purging feature is negated, and the lower channel 356 of seal ring 330 may be thinner or not present at all, so as to increase the capillary lubricant feeding force to make up for the lost bearing circulation systems. Note also that in circulated designs, the recirculation channel 370 exit located along the bottom surface 365 of seal ring 330 should be aligned circumferentially with the lower channel 356 in order to not restrict recirculation flow. Further, an additional circumferential channel 402 seen in FIG. 4A may be needed at the same diameter as the circulation channel 370 of the sleeve to assure no blockage of the circulation channel 370 to the feed channel 356 regardless of assembly orientation. It is also appropriate to note at FIG. 4A that 3 radially extending channels 356 are provided located on the bottom surface 365, fluidly connecting to the axially extending channels 355 at the outer diameter of the seal ring 330. However more or fewer are also feasible assuming proper capillary forces are provided and a minimal circulation flow resistance is achieved. The approach shown herein is to make the bottom surface channels 356 very wide and shallow. The large width allows larger cross sectional area despite the shallow depths so as not to restrict bearing circulation flow from the channel 370 in the sleeve 310 and the reservoir 346 on the opposite side; shallowness allows strong capillary forces to form for effective lubricant feeding and replenishment.

Figure 4B:
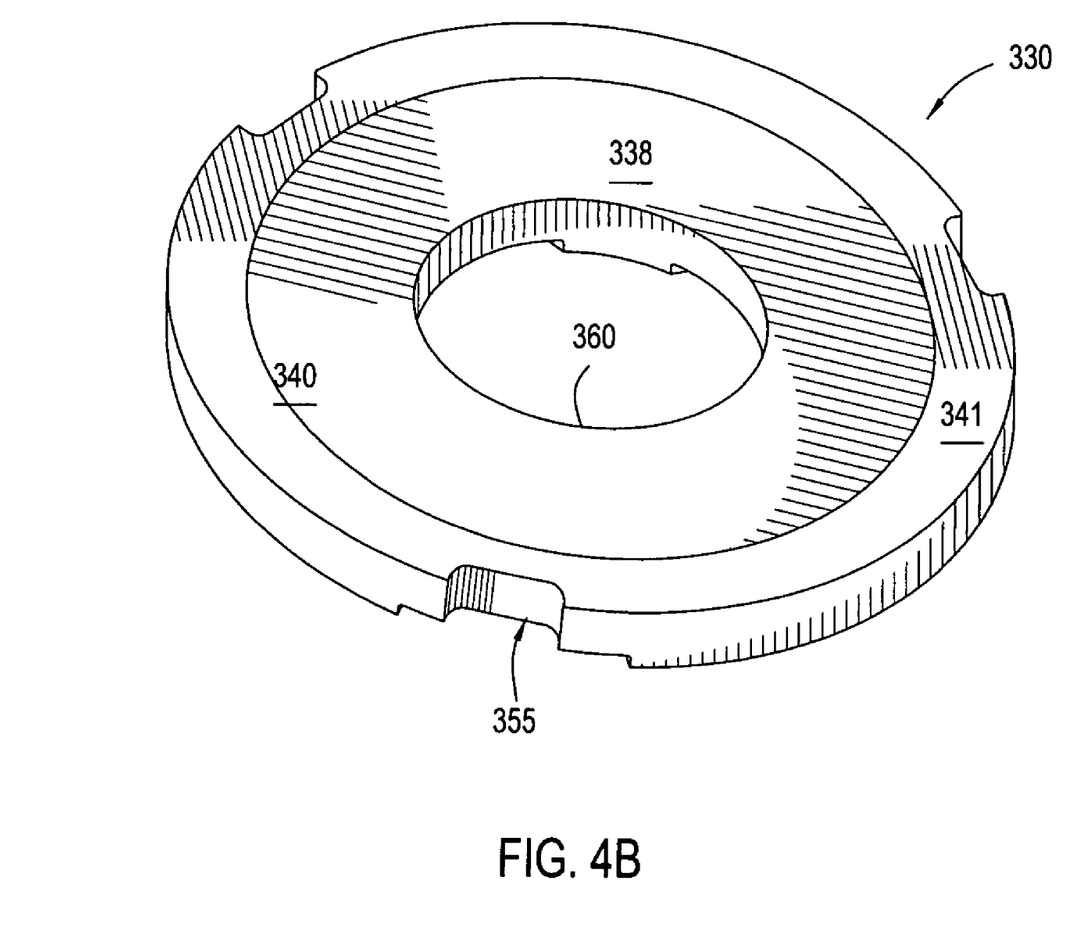
FIG. 4B illustrates an isometric view of an embodiment of a second surface of a seal ring for use the present invention.

FIG. 4B shows the opposite or what is typically the top surface 340 of seal ring 330 or the surface distal from the top surface of the sleeve 310 which comprises a substantially flat region 341 which may also comprise channels and an inclined region 338 which is preferably a continuous surface around the entire circumference of the seal ring 330. It should be noted that because of the tendency of oil to feed through between surfaces which are not perfectly flat and mated, that the channels, which are typically provided on the top surface 340, the end surface 363 and the bottom surface 365 of the seal ring 330 could be, especially in the absence of a recirculation channel 370, substantially eliminated; reliance for circulation could be placed on the tendency of oil to migrate between such surfaces.

It can be seen that the channels on the top 340, end 363 and lower 365 surfaces of the seal ring 330 feed oil to the secondary meniscus or gap 366 by capillary action and bearing circulation flow from the reservoir 346, especially if the successive channels are gradually reduced in cross sectional size. Spillage from the secondary seal or meniscus 366 reflows into the reservoir 346 due to centrifugal force, and the reservoir 346 may be originally filled through the opening 380 which extends through the shield 335 or other opening. The smaller secondary seal 366 is maintained full thereby protecting lubrication of the journal gap 315 against evaporation loss by this feeding and replenishment process. The seal stability is improved by the centrifugal force which is established throughout this system.

FIG. 3B shows an embodiment in which the secondary seal 366 is not centrifugal but is a basic small gap capillary seal. FIG. 3C is a similar embodiment with a centrifugal secondary seal 390 formed by the divergence of wall 391 on the shaft 312 and wall 392 on the surface of seal ring 330 and their mutual inclination relative to axis 301. Both of these walls are at an angle to the central axis (i.e., rotational axis 301) of the shaft 312. In this way, oil flowing up from the circulation channel 370 which shown in FIG. 3B overcomes the centrifugal force under the seal ring to maintain oil over the entire length of the feed channel and in the secondary seal. It is apparent to a person of skill in this field that care must be taken to size the circulation and flow channels consistent with the teachings above such the capillary surface tension forces, centrifugal forces and circulation flow forces are balanced to maintain the fluid at the proper levels.

FIG. 3C also shows that the recirculation channel 370 may be coupled to the feed channel 356 on the bottom of the seal ring 330 at any radial location. In cases where the bearing does not have a recirculation path, the bottom surface 365 may not require feed channels 356 but may work sufficiently with rough surface contacts since the capillary force will be quite strong for overcoming centrifugal force. The feed channels 355 on the seal ring 330 outer surface 363 should be utilized in any event. These channels may generally be formed by stamping, coining, ECM or the like. In the circulated bearing cases, the motor bearing may be oil filled with a needle dispenser and then spun to purge in trapped air through the circulation scheme described above. An improved fill process is also achieved by providing graduated widths (or tapered cross-sections) of the feed channels around the seal ring 330 toward the end of the journal bearing 316, 318. Among other things, such a configuration allows air trapped in the bearing fluid during the fill process to be purged from the motor bearing.

Figure 5:
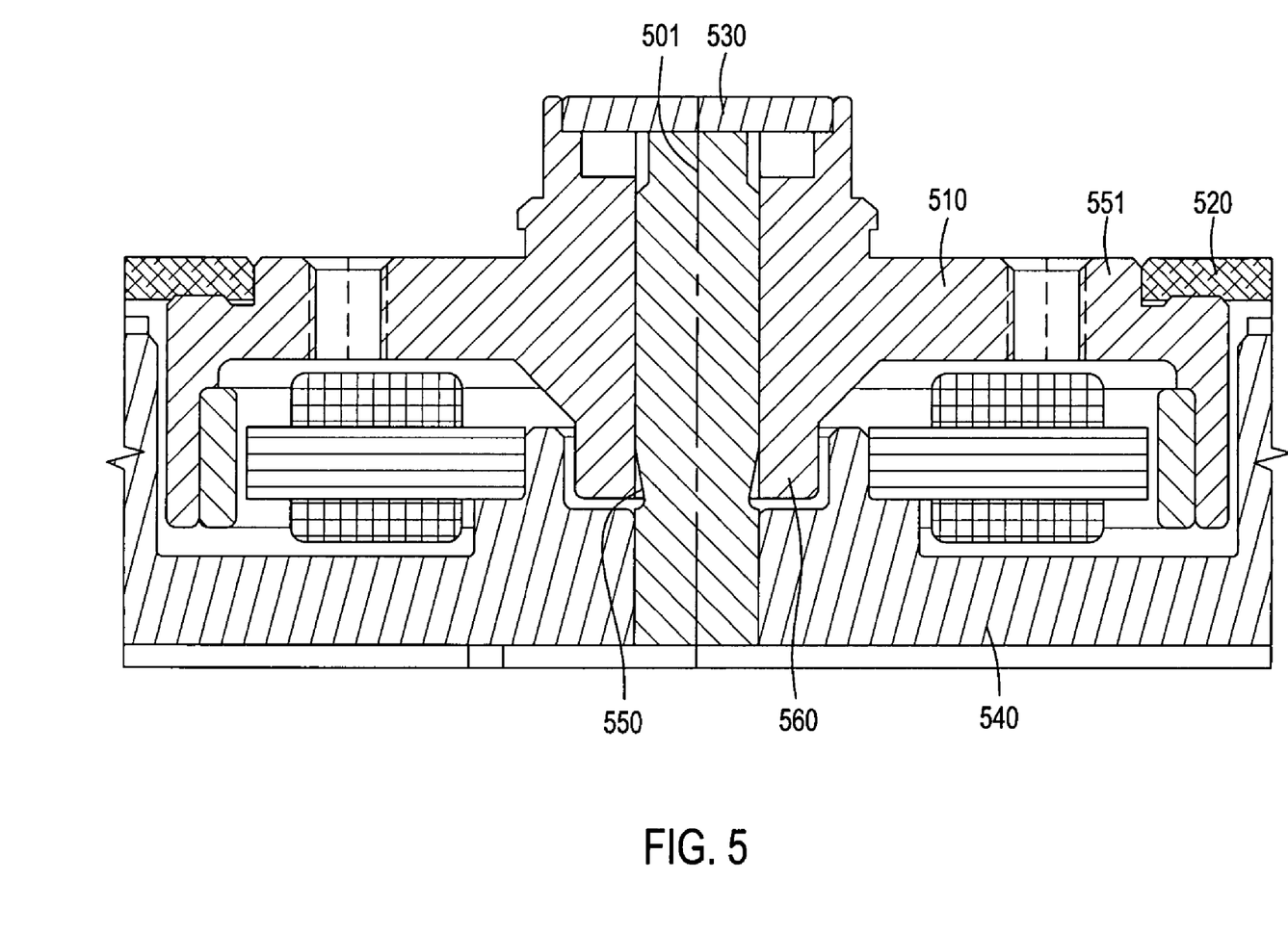
FIG. 5 is a vertical sectional view of an alternative location of the dynamic radial capillary seal of the invention.

Finally, FIG. 5 shows an alternative stationary shaft motor where a sleeve 510 supports a disc or discs 520 for rotation about a stationary shaft 530 (i.e., about a rotational axis 501) which is supported from a base 540. The sleeve 510 is coupled to the hub 550 (or they can be one contiguous piece). In this design, the lower end of the shaft is sealed from the outer atmosphere using a conventional diverging wall capillary seal 550. However, it is readily apparent to a person of skill in this field having read the above disclosure that the dynamic radial capillary seal shown in FIG. 3A at the end of the shaft distal from the base could be just as easily incorporated into the sleeve in the region 560 nearest the base.

It is to be appreciated that although the radial capillary seal 340 of the present invention has been described as being incorporated in the motor 300 discussed above (i.e., the motor illustrated in FIG. 3A), various alternative motor designs in which the shaft is stationary may be adapted to benefit from the present invention.

Thus the present invention represents a significant advancement in the field of fluid dynamic bearing motor design. A radial capillary seal design is provided that may be formed in the rotating parts of a motor. Thus, the seal maintains the advantages of previous radial seal designs (i.e., requires little axial space, does not require sacrifice of angular stiffness, and provides large evaporation loss capacity), but is also capable of being used in conditions where it will be subjected to centrifugal forces. Angular stiffness is further improved by the option of attaching the shaft to the motor cover, so that more journal space is available for the bearing surfaces in the journal and structural stiffness is improved.

While the foregoing is directed to embodiments of the invention, other and further embodiments of the invention may be devised without departing from the basic scope thereof, and the scope thereof is determined by the claims that follow.

What is claimed is:

1. A fluid dynamic bearing motor comprising:
    a stationary member;
    a rotating member configured to rotate about a rotational axis;
    a fluid dynamic bearing configured to support relative rotation between the stationary member and the rotating member;
    a dynamic radial capillary seal defined at least in part by the rotating member;
    a seal ring coupled to the rotating member, the seal ring including a first surface that partially defines a bearing fluid reservoir of the dynamic radial capillary seal; and
    a secondary capillary seal defined by an inner surface of the seal ring and an outer surface of the stationary member;
    wherein the secondary capillary seal is in fluid communication with the dynamic radial capillary seal.

2. The fluid dynamic bearing motor of claim 1, wherein the inner surface of the seal ring and the outer surface of the stationary member diverge with increasing axial distance from the fluid dynamic bearing.

3. The fluid dynamic bearing motor of claim 1, wherein one or more channels are defined along the seal ring, the one or more channels configured to fluidly couple the bearing fluid reservoir to the secondary capillary seal and to the fluid dynamic bearing.

4. The fluid dynamic bearing motor of claim 1, wherein one or more end channels are defined along an outer surface of the seal ring, and one or more lower channels are defined along a bottom surface of the seal ring, the one or more end channels and the one or more lower channels configured to fluidly couple the bearing fluid reservoir to the secondary capillary seal and to the fluid dynamic bearing.

5. The fluid dynamic bearing motor of claim 4, further comprising one or more recirculation channels, each recirculation channel configured to couple a distal end of the fluid dynamic bearing to one of the lower channels defined along the bottom surface of the seal ring.

6. The fluid dynamic bearing motor of claim 5, wherein a circumferential channel is defined along the bottom surface of the seal ring, the circumferential channel configured to fluidly couple together the one or more lower channels defined along the bottom surface of the seal ring to each of the recirculation channels.

7. The fluid dynamic bearing motor of claim 5, wherein the fluid dynamic bearing is configured asymmetrically to pump bearing fluid away from the dynamic radial capillary seal to establish a circulation of bearing fluid through the fluid dynamic bearing that returns bearing fluid to the dynamic radial capillary seal through the one or more recirculation channels.

8. The fluid dynamic bearing motor of claim 4, wherein the one or more end channels and the one or more lower channels are sufficiently shallow to establish strong capillary forces to maintain bearing fluid flow towards the fluid dynamic bearing.

9. The fluid dynamic bearing motor of claim 4, wherein one or more upper channels are defined in a flat region of a top surface of the seal ring, the one or more upper channels, the one or more end channels and the one or more lower channels configured with successively reduced cross-sections to enable capillary movement of the bearing fluid and spontaneous evacuation of air bubbles from the bearing fluid.

* * * * *